United States Patent [19]
Nicolas et al.

[11] Patent Number: 5,299,036
[45] Date of Patent: Mar. 29, 1994

[54] LIQUID CRYSTAL PROJECTOR INCLUDING A POLARATION ROTATING ELEMENT

[75] Inventors: Christophe Nicolas; Jean-Pierre Huignard, both of Paris, France

[73] Assignee: Thomson-CSF, Puteaux, France

[21] Appl. No.: 789,596

[22] Filed: Nov. 8, 1991

[30] Foreign Application Priority Data

Nov. 9, 1990 [FR] France .................. 90 13942

[51] Int. Cl.[5] .................. G03B 21/00; G03B 21/26; G02F 1/1335
[52] U.S. Cl. .................. 359/40; 353/33; 353/34; 359/41; 359/63
[58] Field of Search .............. 359/40, 41, 63; 353/31, 353/33, 34, 121, 122

[56] References Cited

U.S. PATENT DOCUMENTS

| | | | |
|---|---|---|---|
| 4,127,322 | 11/1978 | Jacobson et al. | 359/41 |
| 4,943,154 | 7/1990 | Miyatake et al. | 353/31 |
| 5,024,524 | 6/1991 | Flasck | 359/41 |
| 5,028,121 | 7/1991 | Baur et al. | 359/41 |
| 5,105,265 | 4/1992 | Sato et al. | 353/31 |
| 5,142,387 | 8/1992 | Shikama et al. | 359/41 |
| 5,153,752 | 10/1992 | Kurematsu et al. | 359/41 |
| 5,235,444 | 8/1993 | de Vaan | 353/31 |

FOREIGN PATENT DOCUMENTS

| | | |
|---|---|---|
| 0258927 | 3/1988 | European Pat. Off. |
| 0376395 | 7/1990 | European Pat. Off. |
| 3829598 | 3/1990 | Fed. Rep. of Germany |

OTHER PUBLICATIONS

Patent Abstracts of Japan, vol. 10, No. 268 (E-436), Sep. 12, 1986, JP-A-61 090 584, Aug. 5, 1986, H. Masami, "Projection-Type Display Device".
Patent Abstracts of Japan, vol. 12, No. 461 (E-689) (3308), Dec. 5, 1988, of JP-A-63 182 987, Jul. 28, 1988, M. Tajima, "Light Polarizing Element for Liquid Crystal Display Projector".
Patent Abstracts of Japan, vol. 10, No. 308 (P-508) (2364), Oct. 21, 1986, of JP-1-61 122 626, Jun. 10, 1986, M. Himuro, "Polarized Light Illuminating Device".

*Primary Examiner*—William L. Sikes
*Assistant Examiner*—Ron Trice
*Attorney, Agent, or Firm*—Oblon, Spivak, McClelland, Maier & Neustadt

[57] ABSTRACT

Disclosed is an image projector of the type in which an LCD matrix screen is illuminated by two polarized beams after 90° rotation of the direction of polarization of one of these two beams. Each of the two polarized beams is reflected at least once towards an optical axis on which the matrix screen is centered and at least once again towards the matrix screen. Furthermore, the image projector has means to make each beam polarized, so that each polarized beam forms an image of the light source before illuminating the matrix screen. The two polarized beams may thus be oriented towards the matrix screen in forming a small angle with one another, thus enabling the use of a projection objective with a small aperture.

21 Claims, 5 Drawing Sheets

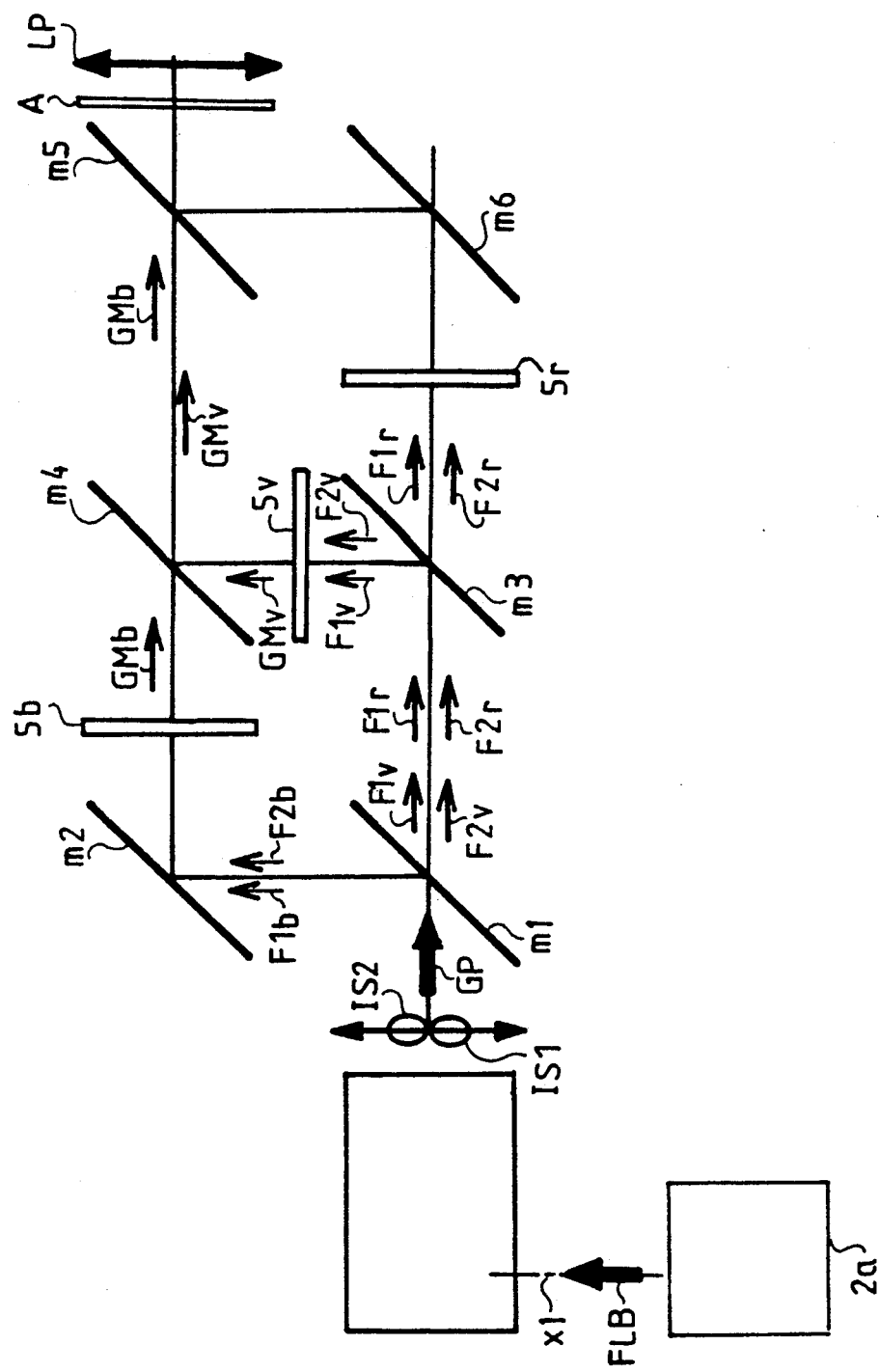

LIQUID CRYSTAL PROJECTOR INCLUDING A POLARATION ROTATING ELEMENT

BACKGROUND OF THE INVENTION

1. Field of the Invention

The invention relates to projectors of images in which a spatial modulation of light is carried out by means of a liquid crystal display screen.

More particularly, it relates to the projectors of images using the two directions orthogonal and complementary directions of polarization of light.

2. Description of the Prior Art

In image projectors, the image projected on a screen results from a spatial modulation of light. The light produced by a source is guided up to a light modulation unit grouping together with the means needed to achieve the spatial modulation of light. It is common practice to use a liquid crystal display (LCD) matrix screen as a spatial modulator of light. This LCD matrix screen comprises a matrix network of elementary liquid crystal cells controlled by means of a video signal: each cell represents an elementary image dot.

The simplest way of forming an image by means of an LCD matrix screen is to illuminate it by means of a linearly polarized light. To do this, it is common practice firstly to interpose a polarizer between the light source and the LCD matrix screen in order to select a particular direction of polarization for the illumination of the LCD matrix screen and then, secondly, after the LCD matrix screen, to place a second polarizer (also called a "polarization analyzer") that converts the angular modulation of polarization produced by the LCD matrix screen into a modulation of intensity. The main drawback of this method is that, by the selection of a particular direction of polarization, for the illumination of the LCD matrix screen, more than half of the light energy is lost.

A known way to improve the efficiency of illumination of the LCD matrix screen is to separate the light spatially into two polarized beams having complementary directions of polarization in order to use all the light produced by the source. Several methods may be used to this effect:

a) In a first method (see European patent application No. 0.372.905), each polarized beam illuminates a different LCD matrix screen, and the images formed separately by the two LCD matrix screens are superimposed. The major drawback of this method is that it calls for the use of two LCD screens, the result of which is that the cost of the image projector is very high;

b) In another method, the direction of polarization of one of the two polarized beams is made to rotate by 90° so that the direction of polarization is the same for both polarized beams. Then the two beams are directed so as to illuminate the LCD matrix screen. A structure such as this has been shown and described in the report (page 90) of the "EURODISPLAY" conference organized by S.I.D. in Amsterdam in 1990.

The structure described in the above-mentioned document has at least one major drawback which lies in the fact that it either leads to a relatively substantial bulkiness of the projector (the distance between the polarization separating element and the LCD matrix screen) needed to prevent the two beams from being propagated towards the LCD matrix screen in forming a relatively large angle between them, or makes it obligatory to use a wide-aperture projection objective. Another drawback of this structure is that it cannot be used to being the two polarized beams with symmetrical optical paths so that it becomes difficult to achieve perfect superimposition of the illumination spots formed by these two beams on the same LCD matrix screen, i.e. to superimpose the sections of these two beams.

SUMMARY OF THE INVENTION

The present invention relates to an image projector of the type in which the illumination of the LCD matrix screen is achieved by two polarized beams, after rotation by 90° of the direction of polarization of one of these two beams.

The invention proposes a new arrangement of a modulation unit such as this, an arrangement that makes it possible, in particular, to provide the modulation unit with compactness while at the same time enabling the use of a projection objective lens with a small aperture.

The invention can be applied to image projectors of the so-called "frontal" type (with scattering reflection of the light projected on the projection screen) as well as to those of the so-called "rear" type (scattering transmission of the light projected on the projection screen). Furthermore, the invention can be applied to the making of monochromatic images as well as color images.

According to the invention, there is proposed an image projector comprising at least one source of light, at least one liquid crystal matrix screen, at least one polarization direction rotating element, at least one polarization separator separating the light into two polarized beams having directions of polarization that are orthogonal with respect to each other, the two polarized beams being designed to be modulated by the matrix screen after one of these beams has gone through the rotating element, wherein said projector comprises, firstly, first means to achieve at least two reflections for each polarized beam, a first reflector reflecting the beam towards an optical axis on which the matrix screen is centered and a second reflector then reflecting it towards the matrix screen, and wherein said image projector comprises, secondly, second means to make each polarized beam convergent on at least a part of its path between the polarization separator and the matrix screen, so that each polarized beam forms an image of the light source between the first reflector and the matrix screen.

This arrangement makes it possible, notably, to orient the two polarized beams towards the matrix screen, by mirrors placed very close to the main optical axis, so that the two polarized beams form a small angle with each other and so that each polarized beam forms an image of the light source in the vicinity of the optical axis.

This arrangement further offers the advantage of enabling perfect symmetry in the paths of the two polarized beams.

BRIEF DESCRIPTION OF THE DRAWINGS

The invention will be understood more clearly from the following description of certain of its embodiments, made with reference to the appended figures of which:

FIG. 5 shows a schematic view of a color image projector of the type shown in FIG. 3, but using separate wavelength-selective mirrors.

DETAILED DESCRIPTION OF THE INVENTION

Figure 1:
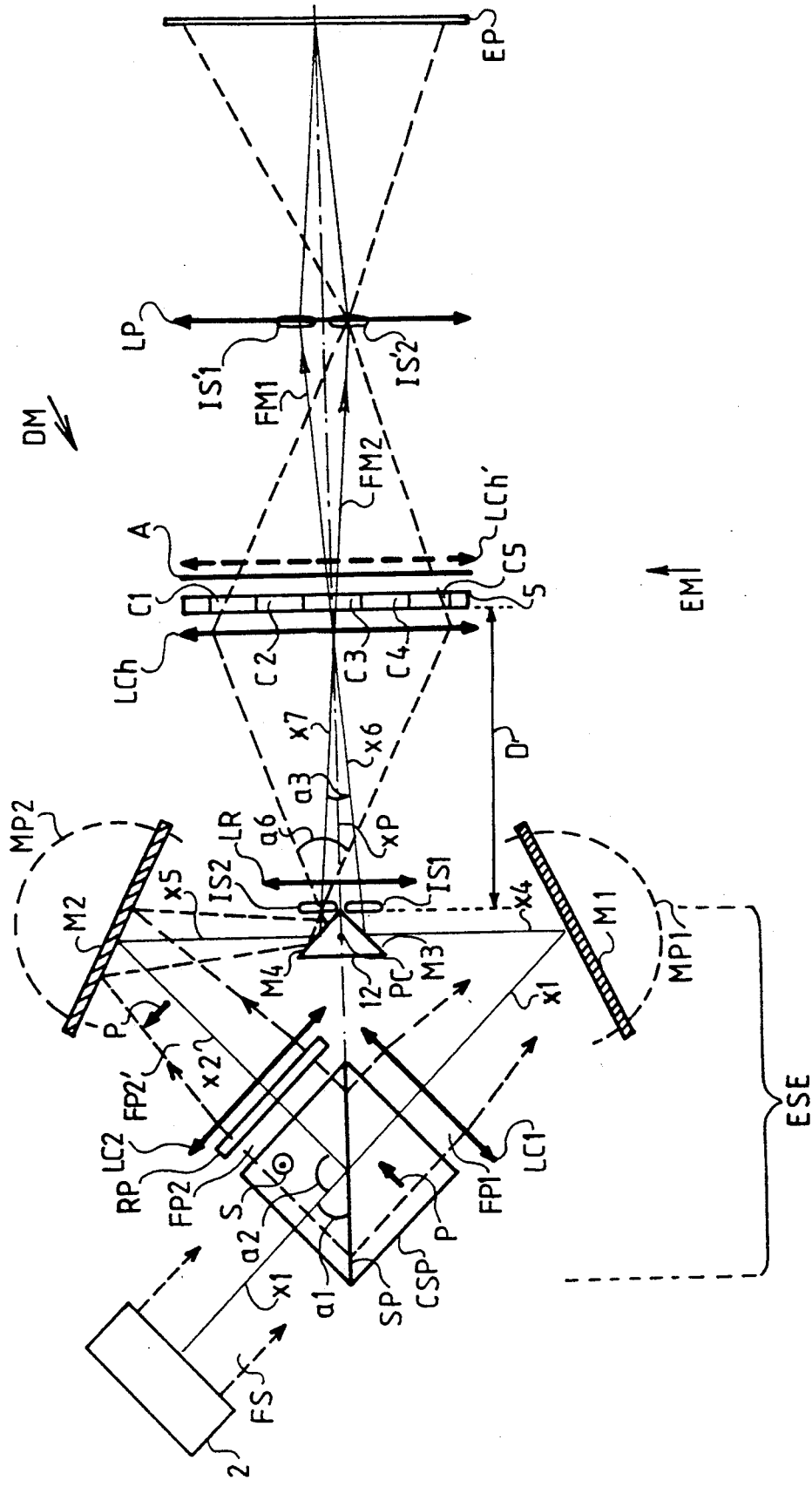
FIG. 1 shows a schematic view of a projector according to the invention, enabling the projection of monochromatic images.

FIG. 1 shows the drawing of an image projector 1 according to the invention, of a monochromatic type.

The projector 1 has a light source 2 producing a light beam FS called a source beam, the light of which has no special direction of polarization. In a standard way, the rays of the source beam are made practically parallel. To this effect, for example, the light source may be constituted by an illumination lamp (not shown), placed at the focal point of a parabolic reflector (not shown) or else again at the focal point of a convergent lens.

The source beam FS is propagated along an axis of propagation x1 towards a polarization separator SP. The polarization separator SP may be of a standard type. It may be constituted, for example, by a polarization separating surface SP formed by a stack of films that are thin layers of dielectric materials, so as to cause an alternation of different indices of refraction according to a standard technique. Polarization separating surfaces such as this, made in cubes known as "polarization separating cubes", are commonly available in the market.

In the non-restrictive example described, the separating surface SP is located on the axis of propagation x1 and forms an angle a1 of 45° with this axis. The separating surface SP splits the source beam FS into two polarized beams FP1, FP2 of practically equal intensity, but with perpendicular directions of polarization.

The first polarized beam FP1 is a transmitted beam which, having crossed the separating surface SP, is propagated along the first axis of propagation x1 towards a mirror M1. The light that constitutes the first polarized beam FP1 has a direction of polarization P parallel to the plane of incidence on SP (the plane of incidence being the plane that contains the mean incident ray of FS, i.e. the axis x1, and the normal to the separating surface SP).

The second polarized beam FP2 is a beam reflected by the separating surface SP along a second axis of propagation x2, towards a mirror M2. The second axis of propagation x2 forms an angle a2 of substantially 90° with the first direction of propagation x1. The second polarized beam FP2 has a direction of polarization S perpendicular to the plane of incidence, i.e. it is orthogonal to that of the first polarized beam FP1.

The two polarized beams FP1, FP2 are intended to illuminate an LCD matrix screen 5 comprising, in a standard way, "90° nematic helix" type liquid crystals arranged in lines and columns. To simplify the figure, only five liquid crystal cells C1 to C5 are shown forming a column, each cell C1 to C5 symbolizing a line of cells that extends perpendicularly to the separating surface SP.

The two polarized beams FP1, FP2 should be modulated by the same portion of matrix screen 5. To this end, a polarization rotating element RP is interposed on the path of either of these two polarized beams in order to cause a 90° rotation of the polarization of the light forming the chosen beam. In the non-restrictive example described, the rotating element RP is positioned on the path of the second polarized beam FP2, on the second axis of propagation x2 and between the separating surface SP and the mirror M2 in order to cause a 90° rotation of the direction of polarization of this beam and bring it from an S type direction to a P type direction. Thereafter, the second polarized beam emerges from the rotating element RP as a beam referenced FP2', the direction of polarization of which is of the P type, i.e. identical to that of the first polarized beam FP1.

Thus two polarized beams FP1 and FP2' are obtained. These beams are propagated in two mutually perpendicular directions and have identical directions of polarization P. (To simplify FIG. 1, the limits of the first polarized beam FP1 have been shown only partially).

According to one characteristic of the invention, the two polarized beams FP1, FP2' are each reflected a first time, by the first mirrors M1, M2, towards an optical axis xP on which the matrix screen 5 is centered, then they are each reflected a second time, by means of second mirrors M3, M4, towards the matrix screen 5.

According to another characteristic of the invention, the two beams FP1, FP2' are made convergent so that they can each form an image IS1, IS2 (symbolized in the figure by an oval) of the source, preferably in the vicinity of the main optical axis xP. The result thereof is that these two beams FP1, FP2' may be sent back towards the matrix screen 5 in forming a relatively small angle a3 with each other.

According to another characteristic of the invention, the polarization separating surface SP is located in a plane perpendicular to that of the matrix screen 5. Furthermore, the plane of the separating surface SP contains the main optical axis xP and constitutes a plane of symmetry of the unit formed by the matrix screen 5, the mirrors M1, M2, M3, M4 and the means of convergence of the beams. The relative positioning of these elements could be different, but this arrangement enables the paths of the two polarized beams FP1, FP2' to be given perfect symmetry with respect to the main optical axis, thus facilitating a perfect superimposition of the two polarized beams FP1, FP2' on the matrix screen 5.

In the non-restrictive example described, the two polarized beams FP1, FP2' are directed by the first mirrors M1, M2 towards the same point of convergence PC located on the main optical axis xP. The orientation of the first mirrors M1, M2 is such that the two beams FP1, FP2' are propagated along axes x4; x5 that are merged with each other and are perpendicular to the main optical axis xP.

After reflection by the second mirrors M3, M4, the first and second polarized beams FP1, FP2' are propagated towards the matrix screen 5, along an axis x6 and an axis x7 respectively. These two axes of propagation x6, x7 converge towards each other in order to intersect in the plane of the matrix screen 5 or in the vicinity of this plane.

In the non-restrictive example shown in FIG. 1, the convergence of the two polarized beams FP1, FP2' is achieved by means of a first convergent lens and a second convergent lens LC1, LC2, positioned respectively on the path of the first and second polarized beams FP1, FP2', in the vicinity of the polarization separating surface SP.

The convergent lenses LC1, LC2 are designed, for example, to focus the two beams FP1, FP2' at the point of convergence PC, and the reflection of these two beams on the second mirrors M3, M4 leads to the formation of the source images IS1, IS2 on the axes of propagation x6, X7 at positions which, however, are very close to the main optical axis xP. Naturally, it is also possible for these two beams FP1, FP2' to converge at two different points (not shown), provided that these two points of convergence are symmetrical to each other (i.e. symmetrical to the plane of the separating surface SP).

It must be noted that the orientation of the first mirrors M1, M2 could also be different so that the point of convergence PC is located closer to or further away from the matrix screen 5, the important point being that, as a function of the angular aperture presented by the two polarized beams (such as the angular aperture a6 shown for the beam FP2'), the distance D added to the main optical axis xP, between the matrix screen 5 and the image dots IS1, IS2, is appropriate for making these beams illuminate the surface of the matrix screen 5 entirely without overflowing, so that all the light energy goes through this screen 5.

In the non-restrictive example described, a field lens LCh is positioned on the main optical axis xP in the vicinity of the matrix screen 5, between this screen and the second mirrors M3, M4. More precisely, the field lens LCh is located substantially at the point of intersection of the two axes of propagation x6, x7. The field lens LCh has the function of forming images IS'1 and IS'2 of the source, in the plane of the input pupil of an objective or system of projection LP (represented schematically in the figure by a lens) located on the main optical axis xP, opposite the field lens LCh with respect to the matrix screen 5. The enlargement of this optical conjugation is such that IS'1 and IS'2 are entirely inscribed within the aperture of the projection objective LP. Thus, all the energy that comes from the source 2 and is limited by the condensers or convergent lenses LC1 and LC2 goes through the lenses LCh and LP without loss. It must be noted that, if necessary, a so-called "relay lens" LR can be placed in the plane containing the first two source images IS1, IS2, or in a plane that is very close to it, so as to form an image of the convergent lenses LC1 and LC2 in the plane of the field lens LCh, the relay lens LR being designed to allow all the light energy coming from the convergent lenses LC1, LC2 to go through the field lens LCh.

The liquid crystal cells C1 to C5 of the matrix screen 5 are activated in a manner that is standard per se (not shown), for example by a video signal. This activation of the cells C1 to C5 results in an angular modulation of the direction of polarization of the light rays which go through the cells, i.e. on the rays that constitute the two polarized beams FP1, FP2'. This angular modulation is converted into a modulation of intensity in a manner known per se, by means of a polarization analyzer A which has the function of selecting a particular direction of polarization (the analyzer works, in this case, as a polarizer).

Thus, if the matrix screen 5 is looked at through the analyzer A, the video image is seen. This image may be projected on the projection screen EP by means of the projection objective lens LP.

In the example shown in FIG. 1, the matrix screen 5 is illuminated by convergent rays, but it could also be illuminated by parallel light rays or rays with a small inclination, for example by choosing the field lens LCh such that the images IS1 and IS2 are in its object focal plane. It is possible, in this case, to place a second field lens LCh' (shown as in dashes) after the matrix screen 5 or after the analyzer A, in such a way as to form the images IS'1 and IS'2 in the plane of the projection objective lens LP.

In the example shown in FIG. 1, the polarization rotating element RP is placed on the path of the second polarized beam FP2 in order to give the two polarized beams the same direction of polarization. Naturally, this can also be obtained by causing a rotation in the direction of polarization of the first polarized beam FP1. In this case, there is no polarization rotating element on the path of the second beam FP2 which keeps the S type of direction of polarization (shown as being perpendicular to the plane of the figure). By contrast, a rotating element must then be interposed on the path of the first polarized beam FP1 to achieve a 90° rotation in its direction of polarization and bring it from the P type direction to the S type direction.

It must be noted that the 90° rotation of the direction of polarization may be obtained in a standard way by means of a rotator of the type formed by a crystal plate known as a "half-wave" plate. However, a plate such as this has the drawback of being chromatic, i.e. it works accurately only for one wavelength and for a relatively narrow spectral band around this wavelength. According to one characteristic of the invention, the polarization rotating element RP is constituted by a liquid crystal cell of the 90° nematic helix type working in a so-called waveguide mode. A cell such as this performs the desired function while at the same time being less costly and less chromatic. Naturally, a cell such as this needs to be appropriately oriented with respect to the directions of propagation and polarization of either of the two polarized beams FP1, FP2.

It has to be noted that the polarization separating surface SP may be made in a conventional way in a separator cube CSP and, in this case, it is advantageous to place the rotating element RP against one face of the separator cube CSP.

It has to be noted furthermore that the convergence of each polarized beam FP1, FP2' may be obtained otherwise than by means of convergent lenses LC1, LC2. For example, it is possible to use a parabolic mirror MP1, MP2 (shown in dashes in FIG. 1) instead of each of of the first mirrors M1, M2. In this case, the convergent lenses LC1, LC2 may be eliminated.

It may be noted, finally, that the second mirrors M3, M4 used to orient the two polarized beams towards the matrix screen 5 may advantageously be formed on the two faces of a prism 12 making it possible, in particular, to give them greater compactness and making it easier to position them and arrange them symmetrically.

The example of FIG. 1 can be applied to a monochromatic projector working, for example, with a white or monochromatic light. However, the advantages provided by the invention are further amplified in the case of a color image projector where it is necessary to multiply several of the functions performed in a monochromatic projector.

Thus, several main functions may be emphasized in the projector 1 of FIG. 1. Some of these functions have to be reproduced several times in a color projector:

Among these main functions, there is the separation of the orthogonal polarizations P, S into two polarized beams FP1, FP2 or FP2' which are then made to converge so that after at least two reflections of each of these beams they are oriented towards the matrix screen 5 each forming an image IS1, IS2 of the source in the vicinity of the main optical axis xP. To facilitate the rest of the description, firstly the elements that perform these functions are grouped together in a unit called a "separating-orienting unit" ESE and, secondly, the first and second polarized beams FP1, FP2', after they have been reflected respectively by the second mirrors M3, M4 in order to be oriented towards the matrix screen 5, constitute a group of two polarized beams GP.

Another important function to be distinguished is the modulation function fulfilled by the matrix screen 5. The matrix screen 5 and the field lens LCh (and possibly, if it has been installed, the field lens LCh') are grouped in another unit called the "modulation unit" EM. The first and second polarized beams FP1, FP2', which pass through the matrix screen 5, emerge from this screen 5 respectively constituting a first modulated beam and a second modulated beam FM1, FM2 represented by the axes along which they are propagated (indeed, for greater clarity of FIG. 1, only the limits of the second modulated beam FM2 are shown). These two modulated beams FM1, FM2 are intended to form the same image and, hereinafter in the description, they are called a "group of modulated beams GM".

Finally, the separating-orienting unit ESE followed by a modulator EM, as shown in FIG. 1, is called a "monochromatic device" DM.

Figure 2:
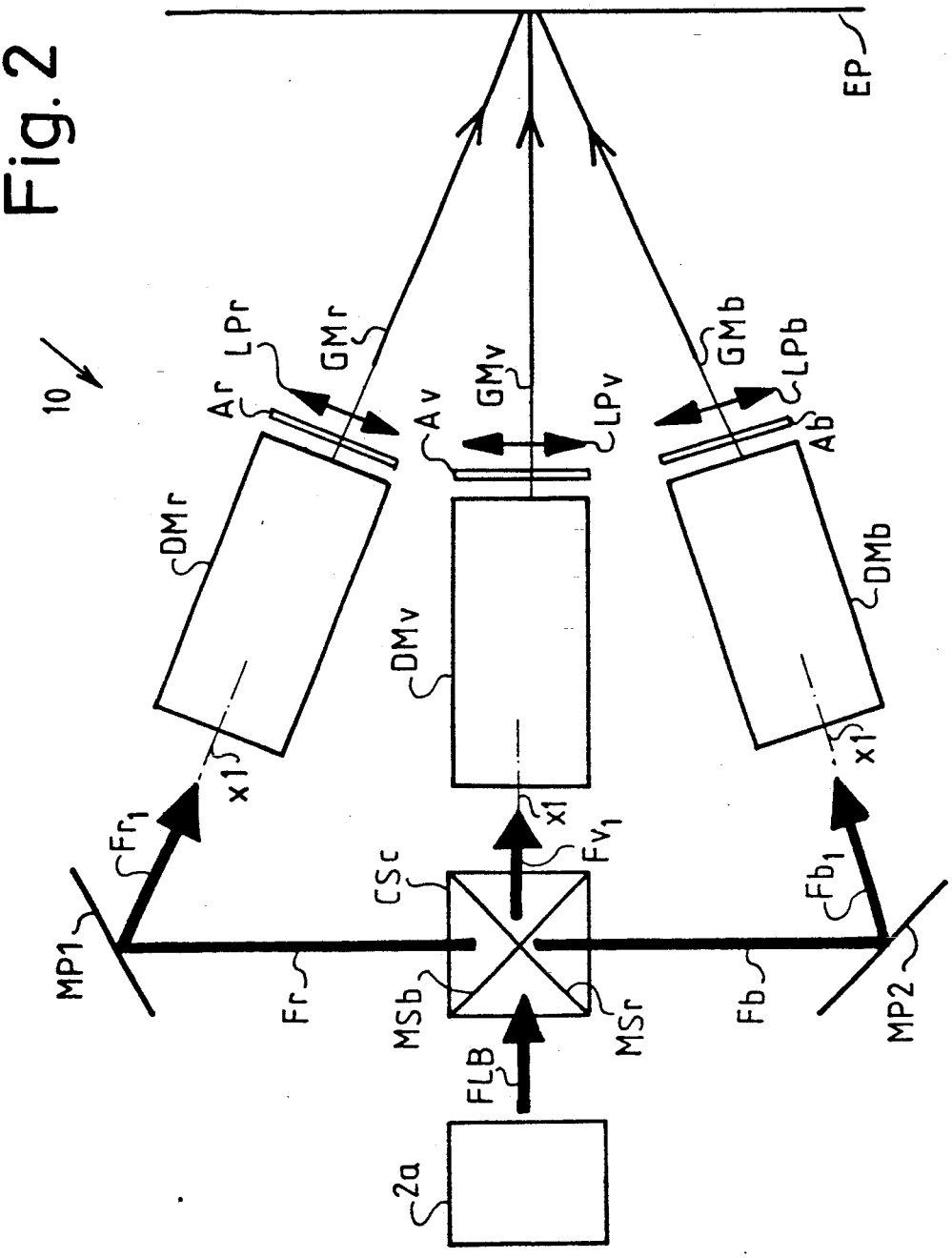
FIG. 2 shows a schematic view of a projector according to the invention, enabling the projection of color images.

FIG. 2 gives a schematic view of an application of the invention to a projector 10 of color images in which the color results from the combination of several primary colors such as, for example, red, green and blue.

The projector 10 has a first, second and third monochromatic device $DM_r$, $DM_v$, $DM_b$ respectively assigned to the processing of a red, green and blue light. Each monochromatic device is similar to the one shown in FIG. 1, and has an axis of propagation x1 on which there is propagated a beam of non-polarized monochromatic light $F_{r1}$, $F_{v1}$, $F_{b1}$, the spectrum of which corresponds to the color of the corresponding monochromatic device. Each of these non-polarized monochromatic beams may be produced from a particular source of light or, as shown in FIG. 2, from a single source of white light 2a. In the latter case, the beam of white light FLB is separated into three monochromatic beams $F_{r1}$, $F_{v1}$, $F_{b1}$ of different colors, by means of wavelength-selective elements such as, notably, dichroic filters, for example by means of a standard dichroic cube CSC in which, for example a wavelength-selective mirror $MS_r$ reflects a red component forming the monochromatic beam $F_{r1}$ which is propagated towards the monochromatic device $DM_r$ after reflection by a plane mirror $MP_1$. Another selective mirror $MS_b$ reflects a blue component forming the monochromatic beam $F_{b1}$ which is propagated towards the monochromatic device $DM_b$ after refection by a plane mirror $MP_2$. The green component forming the beam $F_{v1}$ is transmitted directly towards the monochromatic device $DM_v$.

Each monochromatic device is followed by an analyzer $A_r$, $A_v$, $A_b$ and a projection objective lens $LP_r$, $LP_v$, $LP_b$ in such a way that the groups $GM_r$, $GM_b$ and $GM_v$ of modulated beams are superimposed on the projection screen EP.

Figure 3:
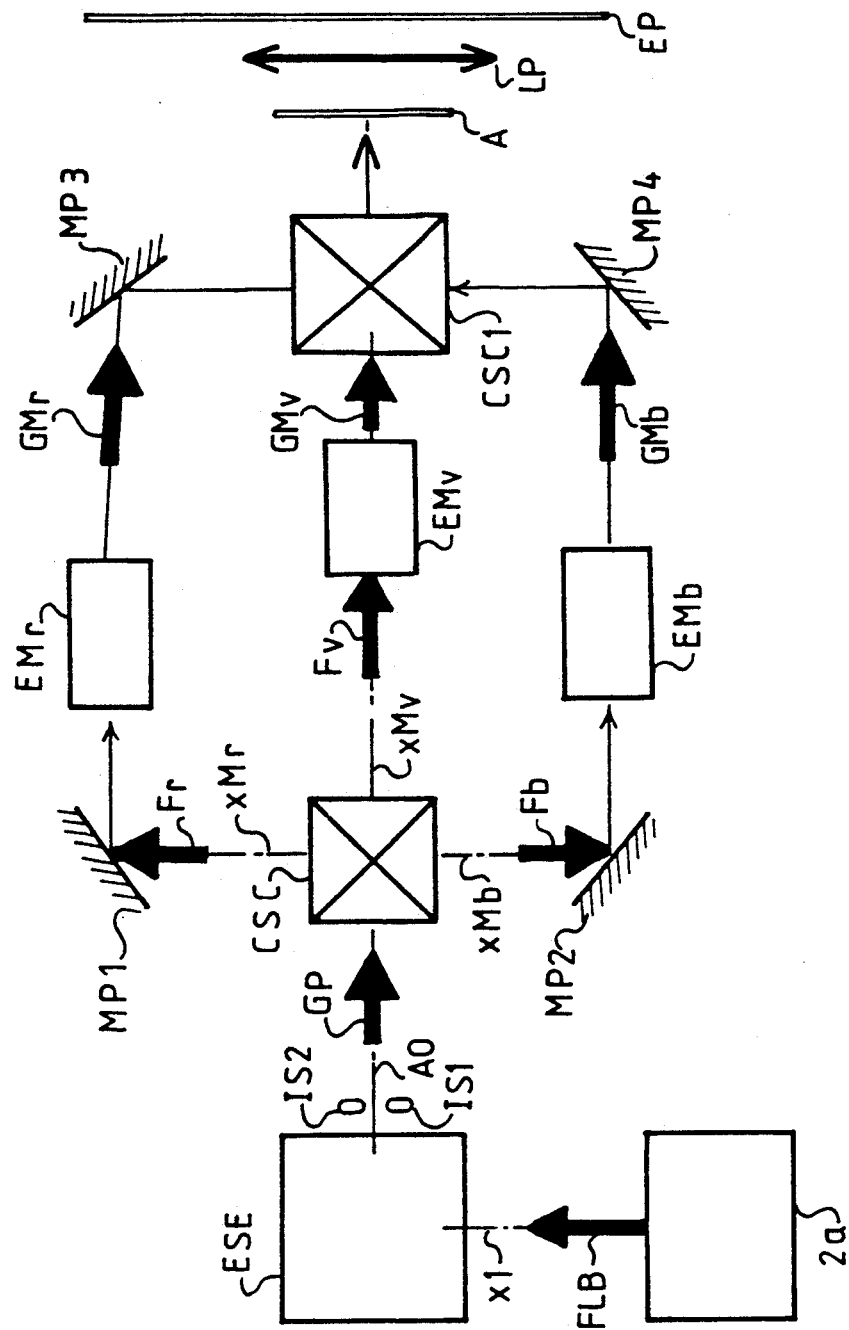
FIG. 3 shows a projector of color images, using a single separator unit.

FIG. 3 gives a schematic view of a color projector 15 that enables the use of a single separating-orienting unit ESE for several sets of modulations assigned to the processing of the different colors.

The light source 2a produces a beam of non-polarized white light FLB. The beam of white light FLB is applied to a separating-orienting unit ESE similar to that of FIG. 1, in a same way as the source beam FS is applied (in FIG. 1).

The separating-orienting unit ESE delivers a group of two polarized beams GP formed by a first polarized beam and a second polarized beam (not shown in FIG. 3) having identical directions of polarization P, as in the case of the two polarized beams FP1, FP2', these two beams having each formed an image IS1, IS2 on either side of an optical axis AO, said optical axis AO corresponding to the main optical axis xP shown in FIG. 1.

Since the source images IS1, IS2 are formed by white light, the three primary colors r, b, v are then separated to illuminate a matrix screen (not shown in FIG. 3) with each color. This is a matrix screen such as the matrix screen 5 shown in FIG. 1. Each of these matrix screens is positioned in a first, second and third modulating unit $EM_r$, $EM_b$, $EM_v$, respectively assigned to the red, blue and green. To this effect, the group GP of two polarized beams passes through a color separating device, which is a standard device per se, such as a dichroic cube CSC similar to the one already shown in FIG. 2. This cube firstly reflects the red and blue components respectively along a first and second monochromatic optical axis $xM_r$, $xM_b$ towards the first and second modulation unit $EM_r$, $EM_b$, by means of a first and second plane mirror MP1, MP2. Secondly, it transmits the green component towards the third modulator unit $EM_v$, along a third monochromatic axis $xM_v$. Naturally, since these red, blue and green components are constituted by a group GP of two polarized beams such as FP1, FP2', they each take the form of two polarized beams (not shown) having the same direction of polarization, each of which has divergent beams, and the axes of which intersect substantially in the plane of the matrix screen, as is the case with the two polarized beams FP1, FP2' (shown in FIG. 1) in their path between the second mirrors M3, M4 and the matrix screen 5.

Each modulator unit EM delivers a group of modulated beams $GM_r$, $GM_b$, $GM_v$ towards a device capable of recombining them by means of a plane mirror MP3, MP4 for the groups $GM_r$ and $GM_b$.

The three groups of modulated beams $GM_r$, $GM_b$, $GM_v$, with different primary colors, may be superimposed or recombined by a dichroic system CSC1, called a reuniting system (similar to the color separating cube SCS) in order to be projected on the projection screen EP by a single projection objective LP. However, as in the case of FIG. 2, the three images formed by the three modulation sets, may also be projected on the projection screen EP by three separate projection objectives.

It must be noted that the field lenses LCh, LCh' (not shown in FIG. 3) mentioned with reference to FIG. 1 may be placed either before or after the separation or superimposition of color carried out respectively by the cube CS and the dichroic system SCS1. It may thus have only one common system of field lenses.

In the same way, there may be one analyzer $A_r$, $A_b$, $A_v$ per channel, i.e. per modulation device, as in the example of FIG. 2. But again, there may be a single analyzer A common to all three colors, positioned after the superimposition of the three colors.

Figure 4:
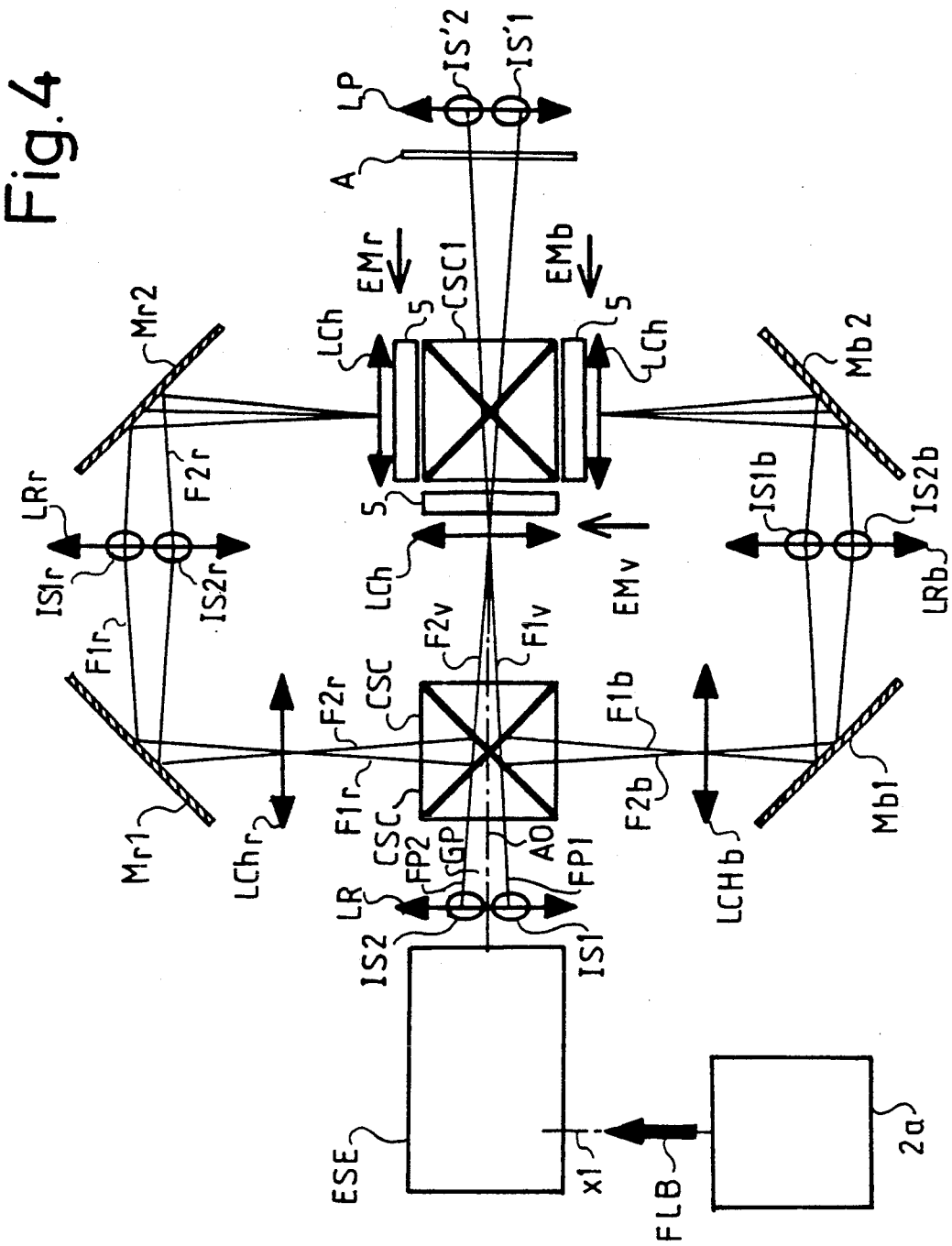
FIG. 4 shows a schematic view of a second version of a color image projector of the type shown in FIG. 3.

FIG. 4 gives a schematic view of how to use the invention in a color projector 20 with three primary colors for example, in which three modulator devices are used, that is three LCD matrix screens such as the matrix screen 5 with an arrangement that enables the use of a projection objective lens common to all three colors with the greatest efficiency with three geometric extents of beams that are identical.

As in the example of FIG. 3, a beam of white light FLB is applied to a separating-orienting unit ESE which delivers a group GP of two complementary polarized beams of white light, with which two source images IS1, IS2 are formed. These two beams correspond to the two polarized beams FP1, FP2' shown in FIG. 1.

The two polarize beams FP1, FP2' of white light pass through a dichroic system, a color separating cube CSC for example, which produces beams having the same geometrical characteristics but with a narrow spectral range corresponding to the red, blue and green.

The green light is transmitted by the color separator cube. The green light is formed by two beams $F1_v$ and $F2_v$, respectively similar to the first and second polarized beams FP1, FP2' (FIG. 1). These two beams $F1_v$ and $F2_v$ are transmitted towards the field lens LCh and the matrix screen of a modulator unit $EM_v$ assigned to the green. This modulator unit $EM_v$ is positioned so that the two beams $F1_v$ and $F2_v$ (symbolized by their axis of propagation) intersect substantially at the field lens.

The light component relating to the red is reflected by the color separator cube CSC at 90° with respect to the green light. The red light too, for its part, is formed by two beams $F1_v$ and $F2_v$, respectively similar to the first and second polarized beams FP1, FP2' but the spectrum of which corresponds to the red. The two red beams $F1_v$ and $F2_v$ are propagated towards a modulator device assigned to the red and, to this effect, they pass through a field lens $LCh_r$ which enables the formation of intermediate source images for the red $IS1_r$, $IS2_r$, after the reflection of these red beams by a plane mirror Mr1. In the plane of these intermediate source images, $IS1_r$ and $IS2_r$, a relay lens provides for optical conjugation between the field lens $LCg_r$ and the field lens LCh contained in the modulator assembly $EM_r$, at which the red light arrives after a second reflection in the plane mirror $M_{r2}$.

The third spectral component, that of the blue light, is constituted also by two beams $F1_B$ and $F2_B$ which get propagated towards a modulator device $DM_b$ assigned to the blue component. The routing and the processing of this blue component are deduced by symmetry. The two blue beams $F1_b$ and $F2_b$ go through a field lens $LCh_b$ for the blue component which enables the formation of the images of intermediate sources $IS1_b$ and $IS2_b$ for the blue component, after the reflection of these two beams by a plane mirror $Mb_1$. In the plane of these intermediate source images, a relay lens $LR_b$ provides for an optical conjugation between the field lens $LCh_b$ and the field lens $LCh_b$ contained in the modulator unit $EM_b$, namely the modulator unit at which the blue light arrives after a second reflection by the plane mirror $M_{b2}$.

The three modulator units $EM_v$, $EM_r$, $EM_b$ are positioned around a dichroic system CSC1, a cube for example similar to the cube CSC that enables the superimposition or recombination of the modulated beams which emerge from the three modulating units, and the orienting of these beams of different colors towards a common projection objective lens LP.

The modulation units $EM_r$, $EM_b$ and $EM_v$, the dichroic cube CSC1 and the projection objective LP are positioned so that, for each modulator unit, the field lens LCh forms sources images IS'1 and IS'2 (with the color to which the modulator unit is assigned) in the plane of the projection objective lens LP, in doing so by means of a wavelength-selective reflection carried out in the dichroic cube CSC1.

The beams $F1_b$ and $F2_b$, $F1_r$ and $F2_r$, $F1_v$ and $F2_v$ have the same direction of polarization and it is consequently possible to use a single analyzer A common to all three colors. In this case, the analyzer A is placed between the dichroic cube CSC1 and the projection objective lens LP. However, it is also possible to use three separate analyzers (not shown) which, for example, may be constituted in the form of three plastic sheets bonded to the three input faces of the dichroic cube CSC1.

This arrangement enables the illumination of all three matrix screens 5 with beams having same geometrical characteristics.

The light fluxes are conveyed without loss by means of the field lenses and the relay lenses. Furthermore, the geometric extents of the beam are preserved. It is preferable for all the field lenses $LC_h$ to be identical to one another and, preferably, for all the relay lenses to be identical to one another.

FIG. 5 shows a color projector 25 according to the invention, according to a configuration in which the dichroic cubes CSC and CSC1 of FIG. 5 are replaced by separate mirrors.

Since the source images IS1, IS2 of white light are formed as in the examples of FIGS. 4 and 5, the group GP of two polarized beams of white light get propagated towards a first wavelength-selective mirror m1 sensitive solely to blue light. This mirror reflects the blue component $F1_b$ and $F2_b$, and transmits the green and red components $F1_v$ and $F2_v$, $F1_r$ and $F2_r$. Thus the blue component gets propagated solely in the direction of a second mirror m2 and the red and green components are propagated solely towards a third selective mirror m3. The blue component $F1_b$, $F2_b$ is reflected by the second mirror m3 towards a matrix screen $5b$ assigned to the modulation of the blue component. The second mirror m2 is illuminated only by the monochromatic mirror, green for example. It may therefore be non-selective. Under the effect of the third mirror m3, which is sensitive only to green, the green component $F1_v$, $F2_v$ is reflected towards the matrix screen $5v$ assigned to green, while the red component $F1_r$, $F2_r$ is transmitted by the third mirror m3 towards a matrix screen $5r$ assigned to red. Thus, the three components are each made to cross the matrix screen $5r$, $5b$, $5v$ that is assigned to them, and each of them then constitutes a group of modulated beams $GM_r$, $GM_b$ and $GM_v$. The group $GM_b$ relating to blue successively crosses a fourth selective mirror m4 sensitive only to green and a fifth selective mirror 5 sensitive only to red, to then reach the projection objective lens LP.

The group $GM_v$ relating to the green is reflected by the selective mirror m4 and then crosses the fifth selective mirror m5 to reach the projection objective lens LP.

Finally, the group $GM_r$ relating to red is reflected by a sixth mirror m6 which may or may not be selective, and is then reflected again by the selective mirror m5 towards the projection objective lens LP.

An analyzer may be associated with each matrix screen or else, as shown in FIG. 6, a single analyzer may be interposed, for example between the fifth selective mirror m5 and the projection objective lens LP.

The field lenses and the objective lenses are not shown in FIG. 6, but the arrangement of FIG. 6 is compatible with the use of such lenses.

The advantage of this arrangement is notably that it makes it possible to have equal distances between the source images IS1, IS2 and the matrix screens $5_v$, $5_r$, $5_b$ as well as between these matrix screens and the projection objective lens LP.

Naturally, it is possible to envisage any permutation of the colors.

What is claimed is:

1. An image projector comprising:
   at least one source of light;
   a liquid crystal matrix screen;
   a polarization direction rotating element;
   a polarization separator separating the light into first and second polarized beams having directions of polarization that are orthogonal with respect to each other, the first and second polarized beams being modulated by the liquid crystal matrix screen after one of said first and second polarized beams has passed through the polarization direction rotating element;
   first means for achieving at least two reflections for each of said first and second polarized beams, said first means including first and second reflectors for reflecting the first and second polarized beams, respectively, toward an optical axis on which the liquid crystal matrix screen is centered and third and fourth reflectors for reflecting the first and second polarized beams, respectively, toward the liquid crystal matrix screen; and
   second means for converging the first and second polarized beams on at least a part of the paths of the first and second polarized means between the polarization separator and the liquid crystal matrix screen, so that each of said first and second polarized beams forms an image of the light source between the third and fourth reflectors and the liquid crystal matrix screen.

2. An image projector according to claim 1, wherein the polarization separator has a polarization separating surface, the plane of which is perpendicular to the plane of the liquid crystal matrix screen and contains said optical axis on which the liquid crystal matrix screen is centered.

3. An image projector according to claim 2, wherein said first and second reflectors are positioned symmetrically with respect to the optical axis on which the liquid crystal matrix screen is centered.

4. An image projector according to claim 1, wherein said first and second reflectors are mirrors.

5. An image projector according to claim 4, wherein said second means comprise first and second convergent lenses.

6. An image projector according to claim 5, wherein said first and second convergent lenses are positioned between the polarization separator and the first and second reflectors.

7. An image projector according to claim 4, wherein the first and second reflectors are parabolic mirrors.

8. An image projector according to claim 1, wherein the polarization rotating element is a liquid crystal cell of the 90° nematic helix type.

9. An image projector according to claim 4, wherein the third and fourth reflectors are formed on the faces of a m prism.

10. An image projector according to claim 4, wherein a field lens is positioned in the vicinity of the liquid crystal matrix screen between said liquid crystal matrix screen and the third and fourth reflectors.

11. An image projector according to claim 4, wherein a relay lens is positioned in the vicinity of the third and fourth reflectors between the third and fourth reflectors and the matrix screen.

12. An image projector comprising:
    a light source;
    a plurality of monochromatic devices, wherein each of said monochromatic devices includes:
    a liquid crystal matrix screen;
    a polarization direction rotating element;
    a polarization separator separating the light into first and second polarized beams having directions of polarization that are orthogonal with respect to each other, the first and second polarized beams being modulated by the liquid crystal matrix screen after one of said first and second polarized beams has passed through the polarization direction rotating element;
    first means for achieving at least two reflections for each of said first and second polarized beams, said first means including first and second reflectors for reflecting the first and second polarized beams toward an optical axis on which the liquid crystal matrix screen is centered and third and fourth reflectors for reflecting the respective first and second polarized beams toward the liquid crystal matrix screen; and
    second means for converging the first and second polarized beams on at least a part of the paths of the first and second polarized beams between the polarization separator and the liquid crystal matrix screen, so that each of said first and second polarized beams forms an image of the light source between the third and fourth reflectors and the liquid crystal matrix screen.

13. An image projector according to claim 12, wherein said polarization separator, said polarization direction rotating element, and said first and second means are included in a separating-orienting unit.

14. An image projector according to claim 12, wherein said liquid crystal display screen is included in a modulator unit.

15. An image projector comprising:
    a light source;
    a plurality of modulator units, each including a liquid crystal matrix screen; and
    a separating-orienting unit including:
    a polarization direction rotating element;
    a polarization separator separating the light into first and second polarized beams having directions of polarization that are orthogonal with respect to each other, first and second polarized beams being modulated by the liquid crystal matrix screen after one of said first and second polarized beams has passed through the polarization direction rotating element;
    first means for achieving at least two reflections for each of said first and second polarized beams, said first means including first and second reflectors for reflecting the first and second polarized beams toward an optical axis on which the liquid crystal matrix screen is centered and third and fourth reflectors for reflecting the respective first and second polarized beams toward the liquid crystal matrix screen; and second means for converging the first and second polarized beams on at least a part of the paths of the first and second polarized beams between the polarization separator and the liquid crystal matrix screen, so that each of said first and second polarized beams forms an image of the light source between the third and fourth reflectors and the liquid crystal matrix screen.

16. An image projector according to claim 15, wherein each monochromatic device cooperates with a different projection device.

17. An image projector according to claim 12, further comprising a dichroic color separating device, wherein each of said monochromatic devices includes a modulation unit corresponding to a different specific color.

18. An image projector according to claim 17, wherein the modulation units cooperate with a single projection objective lens by means of a reuniting dichroic device.

19. An image projector according to claim 17, wherein the modulation units cooperate with a plurality of respective projection objective lenses.

20. An image projector according to claim 18, wherein the modulation units are arranged around the reuniting dichroic device, at equal distances from the reuniting dichroic device, and wherein said image projector further comprises third means for forming images of intermediate sources between at least one of the modulation units and the dichroic color separation device.

21. An image projector according to claim 16, further comprising a dichroic color separating device, for selectively separating a plurality of colors from said light source and projecting individual colors of said plurality of colors to respective ones of said plurality of modulator units.

* * * * *